June 3, 1947.　　　T. A. DILLON　　　2,421,485
VIBRATING APPARATUS
Filed March 31, 1941　　　2 Sheets-Sheet 1
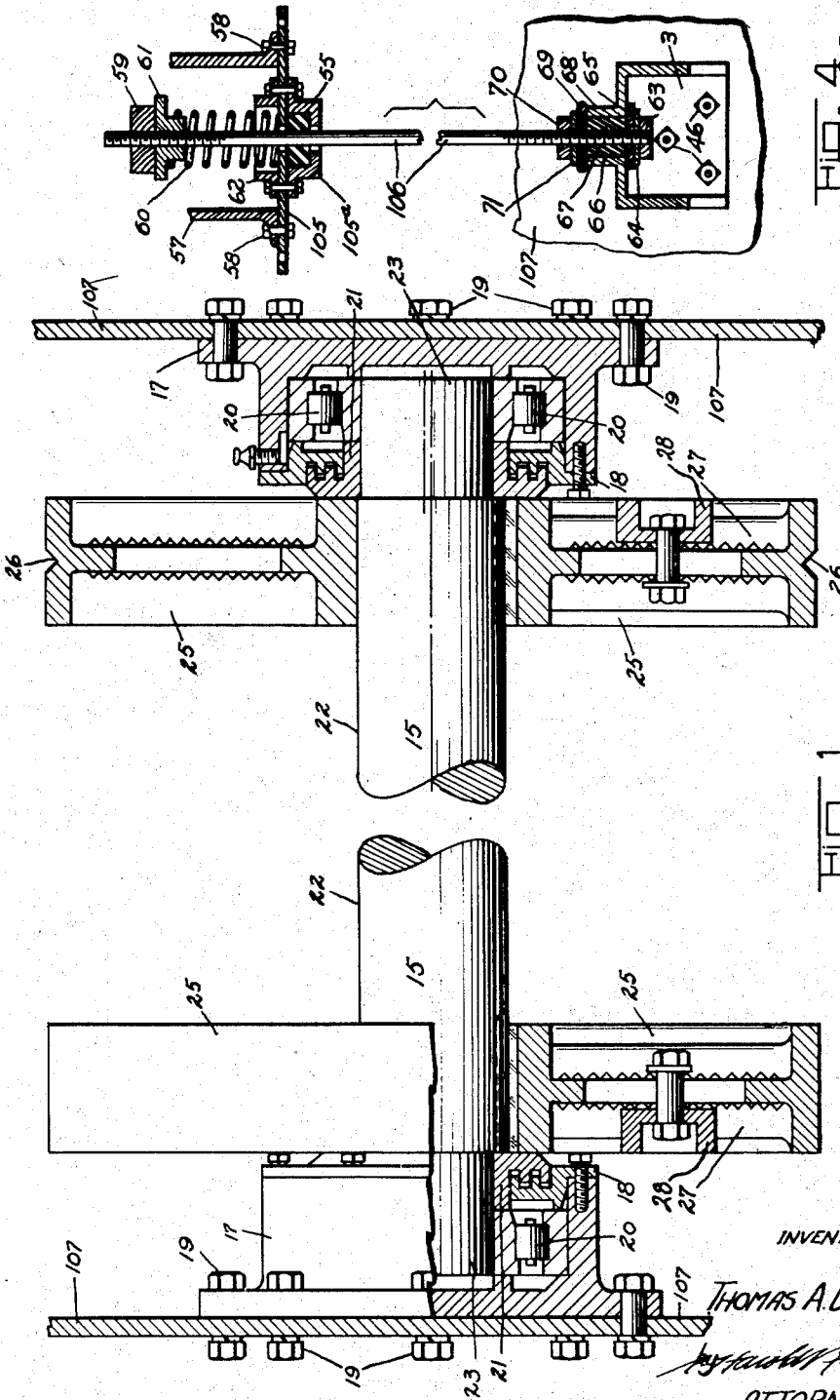
INVENTOR
Thomas A. Dillon
ATTORNEY

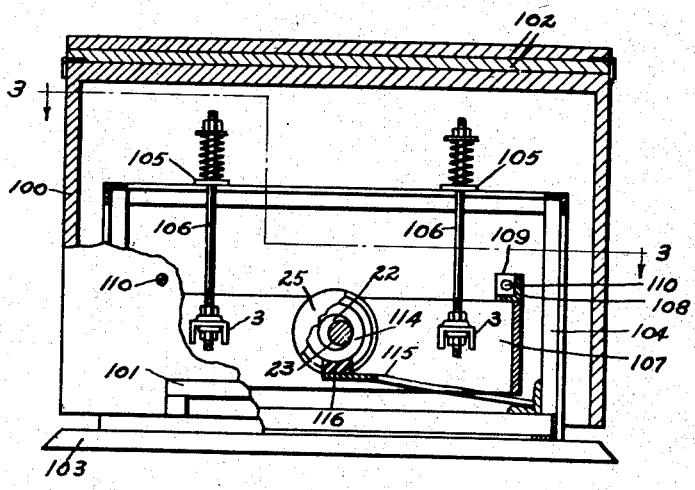
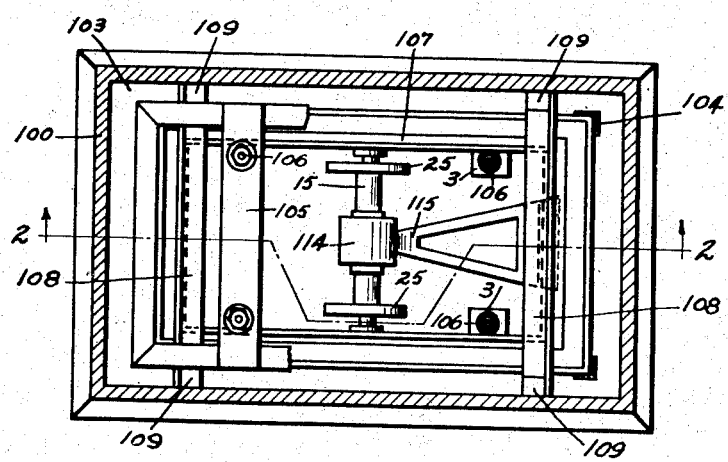
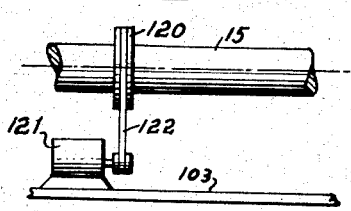

Patented June 3, 1947

2,421,485

UNITED STATES PATENT OFFICE 2,421,485

VIBRATING APPARATUS

Thomas Aloysius Dillon, Toronto, Ontario, Canada, assignor to Dillon Patents Limited, Toronto, Ontario, Canada, a corporation of Canada Application March 31, 1941, Serial No. 386,093
In Great Britain December 6, 1939

3 Claims. (Cl. 74—61)

This invention relates to a vibrating apparatus and more particularly to a therapeutic machine or a mechanical exerciser, whereby high speed vibrations can be imparted to the human body, and constitutes a continuation-in-part of my patent application Serial No. 323,626, filed March 12, 1940, now Patent No. 2,246,483.

One of the principal objects of this invention is to provide a high speed vibrating device in which the vibratable structure constitutes a system which is in both static and dynamic balance about an axis extending substantially through the centre of gravity of the vibratable structure.

The invention consists, in general, of a vibratable structure and a supporting system. The vibratable structure includes an element to be vibrated, such as a therapeutic machine or a mechanical exerciser, having bearings located on an axis perpendicular to the plane of desired movement and substantially at the centre of mass of the vibratable structure. A rotatable member is journalled in and carried solely by the bearings, the shaft and bearings cooperating in such a manner that the bearing axis is spaced apart from the parallel central axis of the mass of the rotatable member. Driving means is provided on the rotatable member which is concentric to the central axis thereof and adapted to rotate said member thereby imparting high frequency vibrations to the vibratable element.

The supporting means are effective for restricting the movement of the vibrating structure in various directions while permitting substantially unrestrained movements through limited distances in a plane, the supporting means and vibratable structure being so devised as to have a lower natural period of vibration than the enforced period imposed upon the vibratable structure from a driving agency.

One of the principal features of my invention resides in the novel vibratable structure which is capable of being vibrated at high speed while the rotatable member, imparting the gyratory movement to the structure, remains sensibly at rest while it spins.

Another feature of the invention resides in the manner in which the vibratable structure is elastically supported so that the vibratable element and its attaching mechanism is in effect a free body and forms a system having a low natural period of vibration.

Other features of the invention reside in the incorporation of the vibrating mechanism into various types of devices such as therapeutic machines or mechanical exercisers and other forms of mechanical vibrators.

From the foregoing and other features as objects in view, as will appear in the course of the following specification and claims, illustrative forms of practising the invention are set forth in the accompanying drawings in which:

Figure 1 is a longitudinal sectional view of a vibrating imparting assembly used in the vibrating apparatus;

Figure 2 is a vertical cross sectional view substantially on the line 2—2 of Figure 3 showing the employment of the invention in a therapeutic machine;

Figure 3 is a horizontal sectional view substantially on the line 3—3 of Figure 2;

Figure 4 is a detail view of the suspension arrangement; and

Figure 5 is a fragmentary front elevation showing the shaft as driven through a belt drive.

Like characters of reference refer to like parts throughout the specification and drawings.

Figures 2 and 3 illustrate a therapeutic device in the form of a vibrating exerciser and comprises, in general, a resiliently supported structure 107 to which is attached the table or seat 100 and carrying a foot rest 101 on one side or end thereof.

The top of the seat can be designed, if so desired, to carry foldable extension members 102 which are hinged to the ends of the top of the seat so that they can be swung upwardly and outwardly to provide the top of the seat with a sufficient surface upon which a patient may lie. The folded back members 102 can be supported by brackets or in any other suitable manner following usual practice.

A supporting frame 104 is contained within the table or seat 100 and rests on the base 103. The frame 104 is of less height, width and length than the interior of the seat 100.

A pair of members 105 extend across the top of the frame 104 and support the upper ends of four hangar rod assemblies as will be explained in detail hereinafter. The lower ends of the hangar rod assemblies are secured to the inner side faces of the sides of the structure 107. A pair of cross members 108 are fastened to the top of the structure 107 and extend from the inner face of one side of the seat 100 to the inner face of the other side. Four blocks 109 are secured upon the ends of the cross-members 108 and screws 110 are passed through orifices in the sides of the seat to be threaded into orifices in the block 109 whereby the seat is secured to structure 107 which, in turn, is suspended from the hangar rod assemblies.

A preferred arrangement by means of which the vibrating structure is resiliently suspended from the fixed structure 104 is illustrated in Figure 4 and includes four hangar rods 106.

Each hangar rod assembly includes a hangar rod 106 which projects through bracket 3 projecting from the side of the rectangular frame 107. The lower end of rod 106 is threaded to receive nut 63. The nut 63 bears against washer 64 which, in turn, bears against rubber washer 65 positioned to rest against the lower face of bracket 3. The rod 106 extends through orifice 66 in bracket 3 and is sheathed within rubber sleeve 67 contained within collar 68 formed on the upper face of the bracket. The top of collar 68 supports the upper rubber washer 69 and the rod 106 also carries nut 70 which is threaded on the rod above the bracket 3 to press the washer 71 against the upper washer 69.

The upper end of rod 106 freely projects through rubber sleeve 55 fastened to plate 105 which is secured to frame 104. The rod is threaded at its upper end to receive nut 59 and compression spring 60 is introduced between the top of the plate 105 and collar 61 located underneath the bottom of the nut 59. The plate 105 is formed with an upwardly extending collar 62 which surrounds spring 60. The collars 61 and 62 retain the spring 60 in its proper alignment surrounding the upper end of rod 106.

To set up the required vibrating or gyratory movement of the frame 107, I provide a shaft 15 which extends transversely of the frame 107. The sides of the frame 107 are provided with aligned bearing housings 17 located, preferably, on an axis perpendicular of the plane of desired movement and substantially at the centre of mass of the frame 107 and superimposed loads, and secured to the inner faces of the sides by means of bolts 19.

Bearings 20 are positioned within the bearing housings to receive the shaft 15 and the bearing housings are provided with the usual dust cap assemblies 18 and 21.

As illustrated in Figure 1, the shaft 15 has a central portion 22 of greatest diameter and which extends across the frame between the roller bearings. The portions 23 of the shaft which are received within the roller bearings 20 are of reduced diameter and are eccentric to the central portion 22 of the shaft. In actual practice, the degree of eccentricity of the eccentric portions 23 of the shaft is determined by the extent to which it is desired to move the vibrating body during each revolution of the shaft. For example, if the eccentric portions 23 are off-centre $\frac{1}{32}$ of an inch, the frame 107 is vibrated with a circular motion $\frac{1}{16}$ of an inch in diameter during each revolution of the shaft.

One or more of the counterbalancing flywheels 25 is concentrically mounted on the central portion of the shaft with the weighted portion 27 directly opposite the throw of the eccentric portions 23 of the shaft. In order to avoid deflection of the portion of the shaft between the bearings, the counterbalancing flywheels are preferably mounted approximate to the bearings.

One of the flywheels may be formed with a groove 26 to receive a driving belt, if desired, or a driven member of circular section, such as in the form of a driven pulley 120, can be concentrically mounted upon the central portion 22 of the shaft. The pulley 120 may be driven from a motor 121 through a belt 122, as illustrated in Figure 5.

In the design and construction of the vibrating mechanism, the shaft and counterbalancing assembly are so proportioned that when the shaft is rotated at its normal operative speed, the axis of rotation will coincide with the geometric axis of the central portion 22 of the shaft. This can be done by casting the counterbalancing wheels approximately the off-balance required and then obtain the fine adjustment by the adjustable weight 28 which may be set at any desired point on the flywheel. In the embodiment of the rotatable member illustrated in Figure 1, the centre of mass, or the mass axis, of the counterbalanced shaft is spaced apart from the axis of rotation and will be between the axis of rotation and the counterbalancing mass. The axis of rotation of the counterbalanced shaft can be physically observed when the system is driven at operative speed by the concentric rotation of the concentrically mounted driving means.

The vibrating assembly may be driven from a motor 121, as illustrated in Figure 5, mounted on the base 103 through the belt 122 or, alternatively, the portion 22 of the shaft may constitute the drive shaft of the motor as illustrated in Figures 2 and 3.

In the embodiment of my invention illustrated in Figures 2 and 3, the shaft constitutes the drive shaft of a motor and extends through motor casing 144 and the motor armature is carried upon the shaft. In order to retain the motor casing 114 against rotation, a flexible tongue 115 is secured to it at one end and at the other end to the structure 107. In order to permit the motor to adjust itself to the eccentric motion of the central portion of the shaft when such shaft is first rotated, a rubber block 116 may be inserted between the end of the flexible tongue 115 and the motor casing.

In operation, the shaft 15 at low speeds rotates about the axis of the eccentric portions 23 with the result that the central portion rotates eccentrically. As the speed of the shaft is increased, the counterbalance becomes effective and the shaft finds its quiescent centre of rotation which, through the design of the shaft and counterbalance assembly, coincides with the geometric axis of the central portion 22. The present structure is particularly adapted for a light duty apparatus where the amplitude of vibration is very small and the requisite starting torque, therefore, is not very high.

In operation, the rate of revolution of the rotatable member is sufficiently high as to be well above the resonant or critical frequency of the system comprised of the vibratable structure and the supporting means, with the result that the vibratable structure moves under the control of the forces set up by the rotatable member and under very small control of the supporting means. Thus, it behaves as a free body because of the small influence of the supporting means on its motion.

The proportioning of the masses attached to the rotatable member is such that the combination of the rotatable member and the vibratable structure have their combined mass centre at the geometrical axis of the central portion 22 of the rotatable shaft. Due, however, to the bearing between the rotatable shaft and the vibratable structure, the entire mass of the vibratable structure has an effect as though it were concentrated on the bearing axis and it makes no contribution to the moment of inertia of the vibratable structure.

When the rotatable shaft is accelerated to operating speed, it passes through the resonance frequency very quickly, after which, when its speed exceeds the resonance frequency, the vibratable structure, including the rotatable member, begins to behave as a free body, that is, it rotates about its mass axis, or the geometrical axis of the central portion 22 of the rotatable shaft. Under these circumstances, the vibratable structure describes an orbital motion with radius equal to the eccentricity of the bearing surfaces. With the rotatable shaft near the centre of gravity of the vibratable structure, the entire vibratable structure describes its orbital motion with no superimposed rotation.

The system comprised of the vibrating frame and other attendant framework, the shaft and the counterbalancing weights moves as though the vibrating frame were constituted as a mass at the centre of their respective bearings, this mass having no moment of inertia. By proportioning the weights in the flywheels correctly, the mass centre of the entire system is made to coincide with the geometrical axis of the shaft with the result that the shaft remains sensibly at rest while it spins and a concentrically mounted driven member of circular section may be used on this shaft without danger to the driving connection.

It will be understood that the invention is not to be construed as limited to the specific modifications described and illustrated herein as other embodiments may be apparent to those skilled in the art in the light of the teachings herein without departing from the scope of the invention as defined in the appended claims.

What I claim as new and desire to protect by Letters Patent of the Untied States is:

1. A vibrating system arranged for movement relative to a quiescent axis of rotation and comprising a body to be vibrated; rotating means for vibrating said body in a vertical plane including a shaft journalled in bearings in said body, said rotating means being supported solely by said bearings and the centre of mass of said rotating means being eccentric to said bearings and to the axis of rotation of said vibrating system and at least a portion of said shaft being concentric with the axis of rotation of said vibrating system at operative speeds; and rotary driving means concentrically mounted on said concentric shaft portion, the axis of said driving means being eccentric to the axis of said bearings and substantially coincident with said axis of rotation of said vibrating system; and yielding means for supporting said body.

2. A vibrating system arranged for movement relative to a quiescent axis of rotation and comprising a body to be vibrated and rotating means for vibrating said body in a vertical plane including a shaft journalled in bearings in a line extending transversely substantially through the centre of gravity of said vibratable body; counterbalancing means carried by said shaft adjacent to said bearings, and the centre of mass of said shaft and counterbalancing means being eccentric to said bearings and to the axis of rotation of said vibrating system; and rotary driving means provided on said shaft, the axis of said driving means being eccentric to the axis of said bearings and substantially coincident with said axis of rotation of said vibrating system when rotating at operative speeds; and yielding means having a relatively low resonant frequency for supporting said body.

3. A vibrating system comprising a yieldingly supported body provided with bearings and rotating means including a shaft journalled in and supported solely by said bearings for vibrating said body in a vertical plane, an eccentric mass integral with said shaft between said bearings, a separate eccentric mass attached to said shaft, whereby the center of the integral mass of said shaft is eccentric to said bearings and rotation of said shaft and attached masses about a quiescent axis of rotation causes circular movement throughout the entire extent of said body, and a pulley for rotating said shaft concentrically mounted on said shaft, the axis of said pulley being eccentric to the axis of said bearings and substantially coincident with said axis of rotation of said shaft and attached masses, the mass of said shaft being displaced from said axis of rotation in the same direction as said attached eccentric mass.

THOMAS ALOYSIUS DILLON.

REFERENCES CITED

The following references are of record in the file of this patent:

UNITED STATES PATENTS

| Number | Name | Date |
|---|---|---|
| 1,797,306 | Webb | Mar. 26, 1931 |
| 2,090,767 | Sayers et al. | Aug. 24, 1937 |
| 1,357,292 | Lowe | Nov. 12, 1920 |
| 1,879,923 | Deister | Sept. 27, 1932 |
| 2,292,327 | Lincoln | Aug. 4, 1942 |
| 899,441 | Taylor | Sept. 22, 1908 |
| 2,246,483 | Dillon | June 17, 1941 |
| 2,267,143 | Soldan | Dec. 23, 1941 |

FOREIGN PATENTS

| Number | Country | Date |
|---|---|---|
| 383,024 | Canada | Aug. 1, 1939 |
| 454,550 | Great Britain | Oct. 2, 1936 |
| 129,918 | Austria | Oct. 10, 1932 |
| 512,810 | Great Britain | Sept. 26, 1939 |
| 608,648 | Germany | Jan. 28, 1935 |